(12) United States Patent
Suzuki

(10) Patent No.: US 10,181,762 B2
(45) Date of Patent: Jan. 15, 2019

(54) INSULATOR AND BRUSHLESS DC MOTOR INCLUDING THE SAME

(71) Applicant: FUJITSU GENERAL LIMITED, Kanagawa (JP)

(72) Inventor: Takashi Suzuki, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 218 days.

(21) Appl. No.: 15/124,452

(22) PCT Filed: Feb. 3, 2015

(86) PCT No.: PCT/JP2015/053006
§ 371 (c)(1),
(2) Date: Sep. 8, 2016

(87) PCT Pub. No.: WO2015/146291
PCT Pub. Date: Oct. 1, 2015

(65) Prior Publication Data
US 2017/0018985 A1    Jan. 19, 2017

(30) Foreign Application Priority Data

Mar. 28, 2014  (JP) .................................. 2014-068968

(51) Int. Cl.
*H02K 3/52*        (2006.01)
*H02K 3/34*        (2006.01)
(Continued)

(52) U.S. Cl.
CPC ................ *H02K 3/52* (2013.01); *H02K 1/14* (2013.01); *H02K 1/2706* (2013.01); *H02K 3/28* (2013.01);
(Continued)

(58) Field of Classification Search
CPC ...................................................... H02K 3/522
(Continued)

(56) References Cited

U.S. PATENT DOCUMENTS 6,879,077 B2    4/2005  Otsuki et al.
8,471,419 B2 *  6/2013  Shimomura ........... H02K 1/148
                                                      29/596
(Continued)

FOREIGN PATENT DOCUMENTS

CA        1155892 A      10/1983
CN        1411122 A       4/2003
(Continued)

OTHER PUBLICATIONS

Search Report issued in corresponding International Application No. PCT/JP2015/053006, dated Mar. 31, 2015.
(Continued)

*Primary Examiner* — Jeremy A Luks
(74) *Attorney, Agent, or Firm* — McDermott Will & Emery LLP

(57) ABSTRACT

In an insulator to insulate teeth of a stator, which is a three-phase electric motor and which has nine teeth or more, and a conducting wire wound around the teeth, slits for parallel wire connection to be conducting wire extraction parts only in parallel wire connection, slits for serial wire connection to be conducting wire extraction parts only in serial wire connection, and shared slits to be conducting wire extraction parts in both of the serial wire connection and the parallel wire connection are provided.

4 Claims, 6 Drawing Sheets

(51) Int. Cl.
*H02K 1/14* (2006.01)
*H02K 1/27* (2006.01)
*H02K 21/14* (2006.01)
*H02K 3/28* (2006.01)

(52) U.S. Cl.
CPC ............ *H02K 3/34* (2013.01); *H02K 3/522* (2013.01); *H02K 21/14* (2013.01); *H02K 2203/06* (2013.01); *H02K 2203/12* (2013.01); *H02K 2213/09* (2013.01)

(58) Field of Classification Search
USPC ............ 310/71, 194, 214–215, 254, 216.008
See application file for complete search history.

(56) References Cited

U.S. PATENT DOCUMENTS

| | | |
|---|---|---|
| 8,482,180 B2 | 7/2013 | Seki et al. |
| 8,519,583 B2 * | 8/2013 | Sakaue ............ H02K 3/522 310/184 |
| 8,608,462 B2 | 12/2013 | Taema |
| 2013/0169085 A1 | 7/2013 | Taema |

FOREIGN PATENT DOCUMENTS

| | | |
|---|---|---|
| CN | 102208839 A | 10/2011 |
| CN | 102457149 A | 5/2012 |
| CN | 102570642 A | 7/2012 |
| CN | 103187808 A | 7/2013 |
| JP | 2000-232745 | 8/2000 |
| JP | 2000-232748 A | 8/2000 |
| JP | 2007-110848 A | 4/2007 |
| JP | 2011-151875 A | 8/2011 |
| JP | 2012-135176 A | 7/2012 |
| JP | 2013-138585 A | 7/2013 |
| JP | 2013-211956 A | 10/2013 |
| JP | 2013211956 A * | 10/2013 |

OTHER PUBLICATIONS

Extended European Search Report issued in corresponding European Patent Application No. 15769706.1, dated Oct. 23, 2017.
Chinese Office Action dated Apr. 3, 2018 issued in Chinese Patent Application No. 201580013426.3 (with English translation).

* cited by examiner

INSULATOR AND BRUSHLESS DC MOTOR INCLUDING THE SAME

CROSS REFERENCE

This application is the U.S. National Phase under 35 U.S.C. § 371 of International Application No. PCT/JP2015/053006, filed on Feb. 3, 2015, which claims the benefit of Japanese Application No. 2014-068968, filed on Mar. 28, 2014, the entire contents of each are hereby incorporated by reference.

TECHNICAL FIELD

The present invention relates to an insulator, which winds a wire around teeth of a stator of an electric motor, and a brushless DC motor including the same.

BACKGROUND ART

Conventionally, in a stator winding with nine poles which winding is star-connected in three phases, specification of a winding such as the number of times of winding, a wire diameter, a winding method, and the like of a winding in a case where three windings in each phase are connected in parallel and that in a case where the windings are connected serially are different. Thus, as an insulator provided to insulate a stator core, which is provided in an end part in an axial direction of a stator that has three phases and nine poles and that is used for a three-phase motor (electric motor), and a winding, different insulators are used for the parallel wire connection and the serial wire connection.

For example, in Patent Document 1, in parallel wire connection, a stator coil winding method to make it easy to perform processing of connecting a lead wire in a stator coil by forming, with one wire, a coil wound around magnetic pole teeth (teeth) at least in the same phase, and a shape of a jumper wire locking insulation plate (insulator) used therein are disclosed.

CITATION LIST

Patent Citation

Patent Document 1: Japanese Laid-open Patent Publication No. 2007-110848

SUMMARY OF INVENTION

Technical Problem

However, the insulator disclosed in Patent Document 1 is an insulator for parallel wire connection and is not assumed to be used in serial wire connection.

The present invention is provided in view of the forgoing and is to provide an insulator, which can be used in connection methods for both of parallel wire connection and serial wire connection, and a brushless DC motor including the same.

Solution to Problem

To solve the above mentioned problem and attain the purpose, the present invention is characterized in that an insulator insulates teeth of a stator, which is a three-phase electric motor and which includes nine teeth or more, and a conducting wire wound around the teeth, the insulator including: a slit for parallel wire connection which slit becomes a conducting wire extraction part only in parallel wire connection; a slit for serial wire connection which slit becomes a conducting wire extraction part only in serial wire connection; and a shared slit that becomes a conducting wire extraction part in both of the serial wire connection and the parallel wire connection.

Moreover, it is preferable that the slit for serial wire connection of the present invention is provided in a position corresponding to the teeth that is not adjacent to a neutral point and a winding end of any power line in a case of the serial wire connection.

Moreover, it is preferable that the slit for serial wire connection of the present invention is formed in a depth identical to a depth of the slit for parallel wire connection.

Moreover, it is preferable that a brushless DC motor includes the insulator described in any one of the present invention.

Advantageous Effects of Invention

According to an insulator of the present invention, a slit for parallel wire connection which slit becomes a conducting wire extraction part only in parallel wire connection, a slit for serial wire connection which slit becomes a conducting wire extraction part only in serial wire connection, and a shared slit that becomes a conducting wire extraction part in both of the serial wire connection and the parallel wire connection are provided. Thus, the insulator can correspond to both of the parallel wire connection and the serial wire connection. Since it is possible to freely select a connection system according to a use and it is not necessary to create an insulator for each connection system, it is possible to provide an insulator with which a cost for a mold can be reduced.

Also, a brushless DC motor of the present invention includes the above-described insulator. Thus, the brushless DC motor can correspond to both of the parallel wire connection and the serial wire connection with the same insulator. In addition, a connection system can be selected freely and a cost for a mold can be reduced.

EMBODIMENTS FOR CARRYING OUT THE INVENTION

In the following, an embodiment of an insulator and a brushless DC motor including the same according to the present invention will be described in detail based on the drawings. Note that the invention is not limited to these embodiments.

Embodiment

Figure 1:
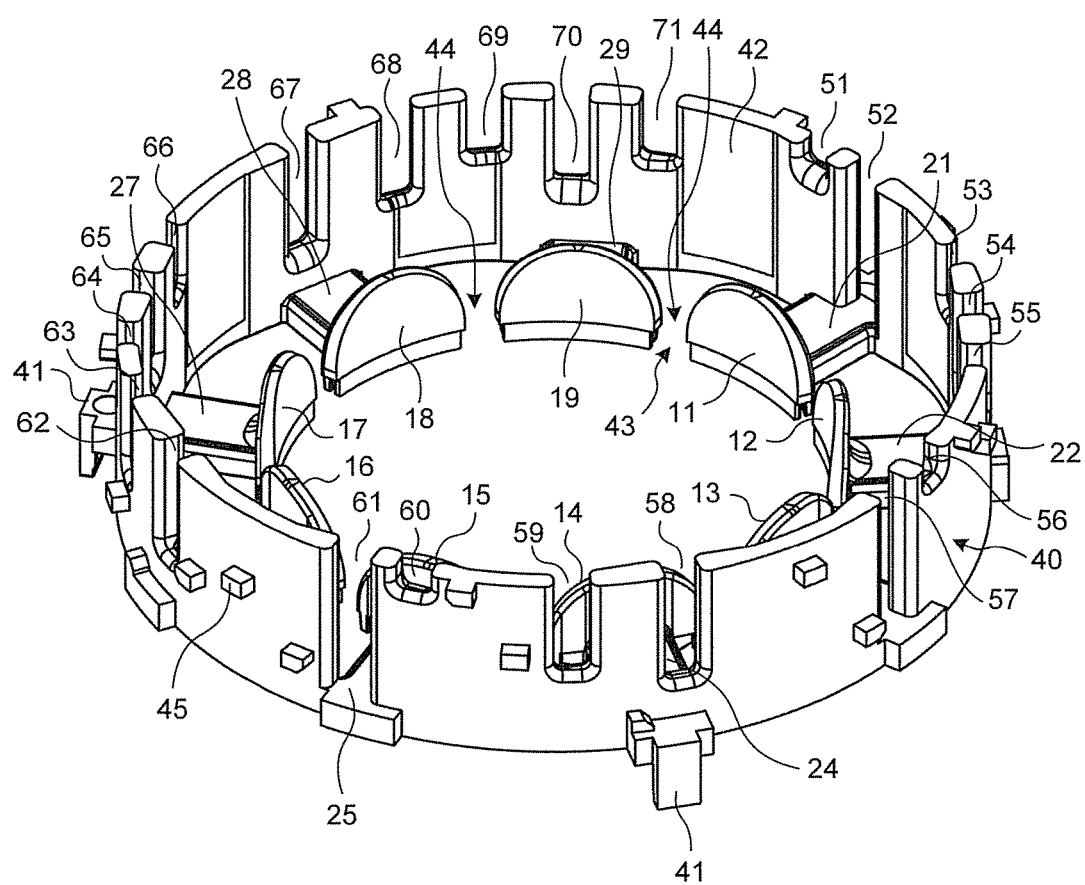
FIG. 1 is a perspective view of an insulator according to the present embodiment.
Figure 2:
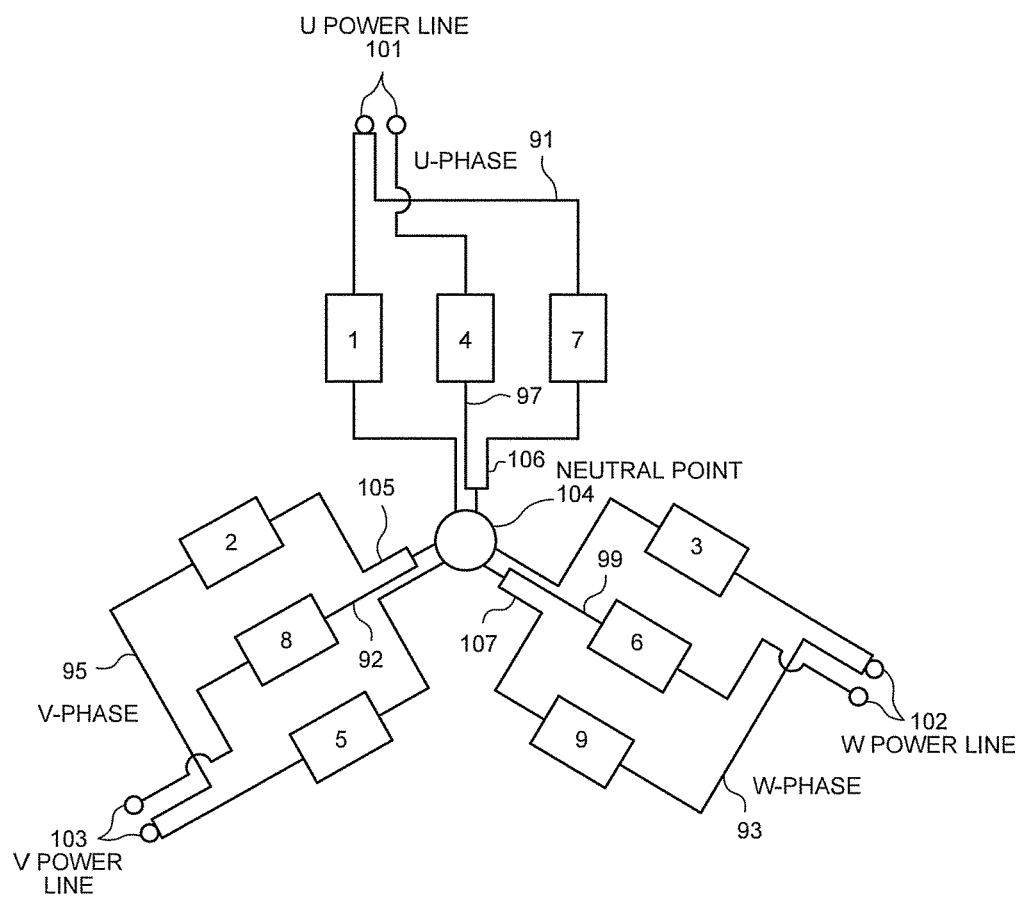
FIG. 2 is a connecting diagram of when parallel wire connection is performed with respect to a stator of an electric motor.
Figure 3:
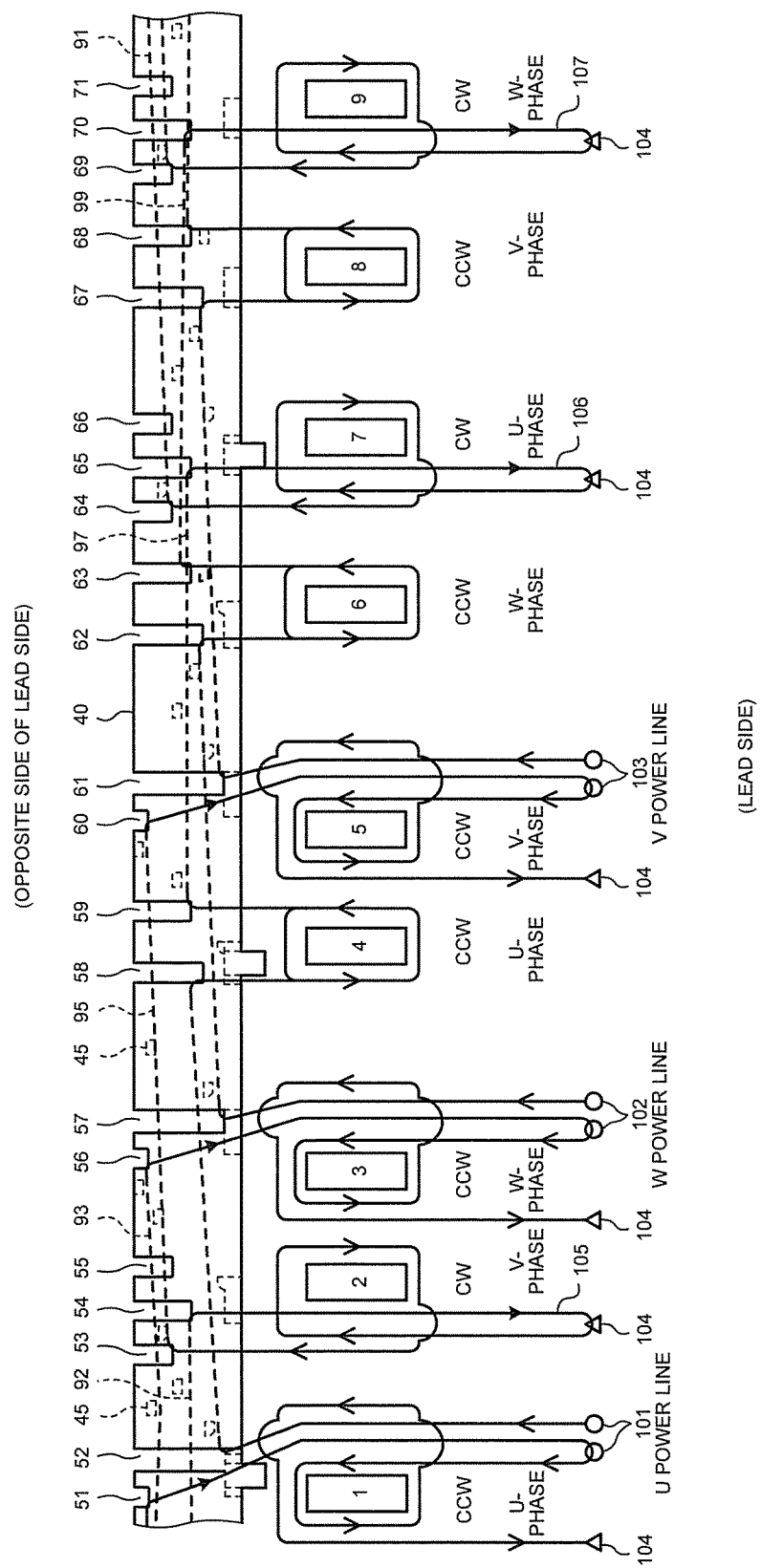
FIG. 3 is a developed view of when the parallel wire connection in FIG. 2 is performed with respect to the insulator in FIG. 1.
Figure 4:
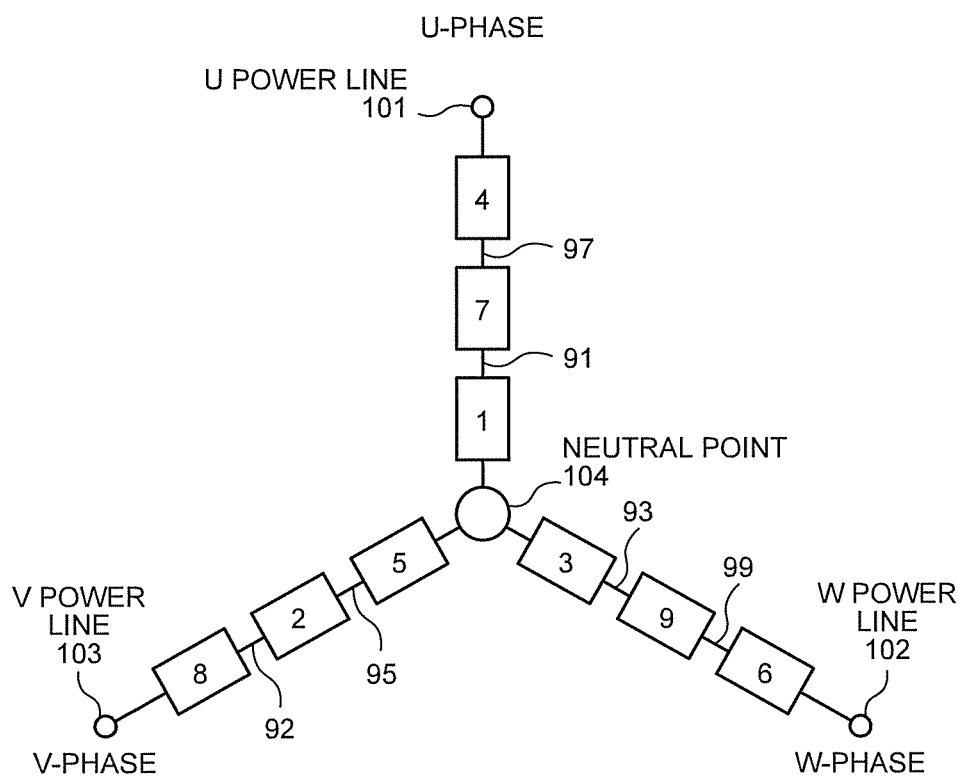
FIG. 4 is a connecting diagram of when serial wire connection is performed with respect to the stator of the electric motor.
Figure 5:
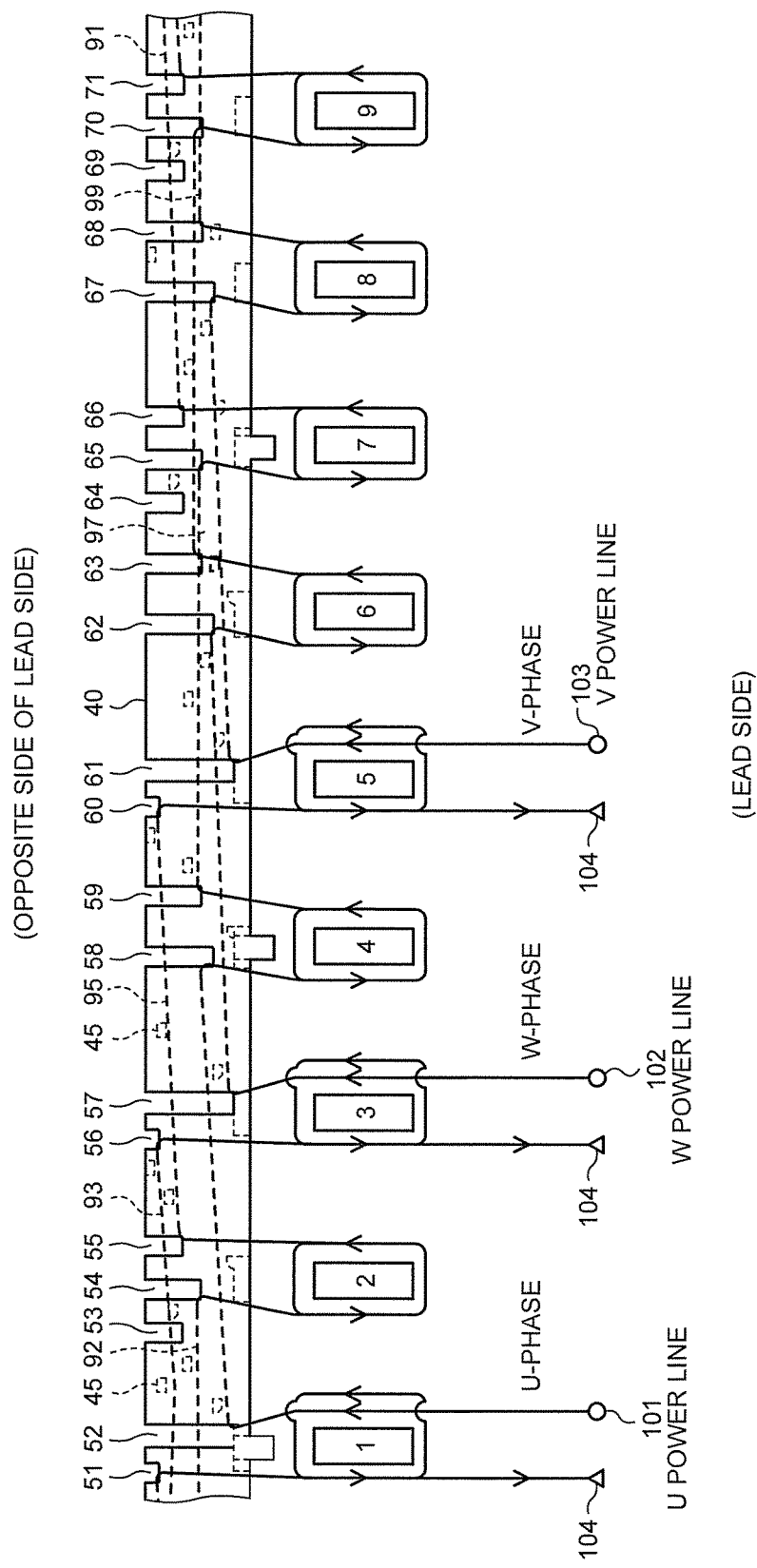
FIG. 5 is a developed view of when the serial wire connection in FIG. 4 is performed with respect to the insulator in FIG. 1.
Figure 6:
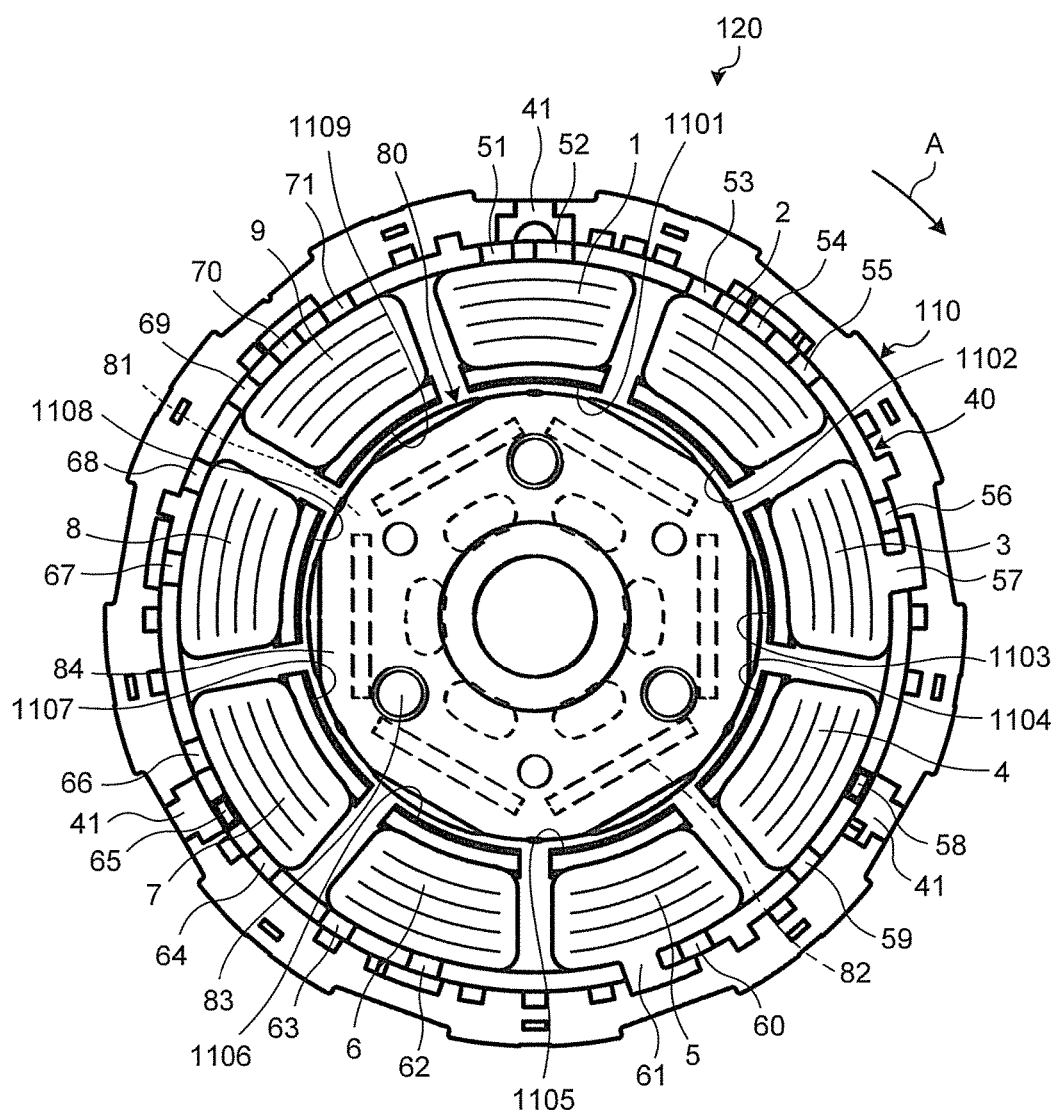
FIG. 6 is a plan view of a brushless DC motor in a state in which a wire is wound around a stator of an electric motor, which includes the insulator in FIG. 1, and a rotor is embedded.

FIG. 1 is a perspective view of an insulator according to the present embodiment, FIG. 2 is a connecting diagram of when parallel wire connection is performed with respect to a stator of an electric motor, FIG. 3 is a developed view of when the parallel wire connection in FIG. 2 is performed with respect to the insulator in FIG. 1, FIG. 4 is a connecting diagram of when serial wire connection is performed with respect to the stator of the electric motor, FIG. 5 is a developed view of when the serial wire connection in FIG. 4 is performed with respect to the insulator in FIG. 1, and FIG. 6 is a plan view of a brushless DC motor in a state in which a wire is wound around a stator of an electric motor, which includes the insulator in FIG. 1, and a rotor is embedded.

As illustrated in FIG. 1, an insulator 40 of the present embodiment is formed in a short cylindrical shape. The insulator 40 includes an outer peripheral wall 42 provided on a yoke of a stator core (not illustrated), drum parts 21 to 29 that are protruded from the outer peripheral wall 42 toward a center on a side of the stator core of the outer peripheral wall 42 and that cover teeth of the stator core, and insulator edges 11 to 19 that are respectively protruded from leading ends of the drum parts 21 to 29 in a semicircular manner in such a manner that a wire wound around the drum parts 21 to 29 and the teeth is supported from an inner diameter side.

Also, an insulator slot 44 and an insulator opening 43 are formed on the stator core side of the outer peripheral wall 42 of the insulator 40 in such a manner as to be surrounded by the drum parts 21 to 29 and the insulator edges 11 to 19. Also, in the outer peripheral wall 42 of the insulator 40, slits 51 to 71 to be extraction parts of a conducting wire (jumper wire) extracted from a conducting wire wound around the teeth of the stator of the electric motor (winding) to an outer periphery of the outer peripheral wall 42 are formed. Moreover, on an outer peripheral surface of the outer peripheral wall 42 of the insulator 40, many protrusions 45 where a jumper wire is held and wired and are arranged. Also, on the stator core side of the outer peripheral wall 42 of the insulator 40, three outer claws 41 fitted to an outer peripheral end part of the stator core to fix the insulator 40 to the stator core are included.

As illustrated in FIG. 1, a characteristic configuration of the insulator according to the present embodiment is that slits 51 to 54, 56 to 65, and 67 to 70 to be extraction parts of a jumper wire in parallel wire connection are included in the outer peripheral wall 42 of the insulator 40 and that slits 55, 66, and 71 for serial wire connection to be extraction parts for serial wire connection are further provided.

As illustrated in FIG. 2, the brushless DC motor according to the present embodiment is a brushless DC motor 120 that has three phases and nine poles and that rotates a columnar rotor 80, which is arranged on an inner diameter side of a stator 110 illustrated in FIG. 6, in a direction of an arrow A in FIG. 6 by applying voltage in three phases of a U-phase, a V-phase, and a W-phase and generating a rotating magnetic field. For example, in the rotor 80, six magnets 82 are arranged uniformly in an axial direction of a rotor core 81 formed by lamination of steel plates in the axial direction. The rotor 80 is covered by an end plate 84 on each side in the axial direction, and caulked and fixed with a rivet for a rotor 83. When windings in the same phase (U-phase: winding 4, 7, and 1, V-phase: winding 8, 2, and 5, and W-phase: winding 6, 9, and 3) are connected in the parallel wire connection illustrated in FIG. 2, a folded wire 106 is generated with respect to a neutral point 104 in the U-phase, a folded wire 105 is generated with respect to a neutral point 104 in the V-phase, and a folded wire 107 is generated with respect to a neutral point 104 in the W-phase.

The folded wires 105, 106, and 107 are connected in a manner illustrated in FIG. 3 when seen in a state of being wound around the stator 110 and the insulator 40. Note that here, a side of the insulator 40 illustrated in FIG. 3 is referred to as an opposite side of a lead side and a side of an insulator on the opposite side thereof with a stator core in between is referred to as the lead side. For example, as illustrated in FIG. 3, a conducting wire connected to a power line in the U-phase (U power line) 101 forms a winding 4 by being arranged as a jumper wire along the outer peripheral surface of the insulator 40 from the slit 52 in the insulator 40, being introduced to the inner peripheral surface from the slit 58 in the outer peripheral wall, and being wound around the drum part 24 in FIG. 1.

The conducting wire wound in the winding 4 is arranged again from the slit 59 along the outer peripheral surface of the insulator 40 and becomes a jumper wire 97. The jumper wire 97 forms a winding 7 by being introduced to the inner peripheral surface from the slit 65 in the insulator 40 illustrated in FIG. 3, being folded on the lead side as the folded wire 106, and being wound around the drum part 27 in FIG. 1.

The conducting wire wound in the winding 7 is arranged again from the slit 64 along the outer peripheral surface of the insulator 40 and becomes a jumper wire 91. The jumper wire 91 forms the winding 1 by being introduced to the inner peripheral surface from the slit 51 in the insulator 40 illustrated in FIG. 3, being folded on the lead side, and being wound around the drum part 21 in FIG. 1. The conducting wire wound in the winding 1 is connected to the neutral point 104 (Δ sign in FIG. 3).

Also, a conducting wire connected to a power line in the V-phase (V power line) 103 forms a winding 8 by being arranged as a jumper wire along the outer peripheral surface from the slit 61 in the insulator 40, being introduced to the inner peripheral surface of the outer peripheral wall from the slit 67 in the insulator 40, and being wound around the drum part 28 in FIG. 1.

The conducting wire wound in the winding 8 is arranged again from the slit 68 in the insulator 40 along the outer peripheral surface and becomes a jumper wire 92. The jumper wire 92 forms a winding 2 by being introduced to the inner peripheral surface from the slit 54 in the insulator 40 illustrated in FIG. 3, being folded at the neutral point 104 on the lead side as the folded wire 105, and being wound around the drum part 22 in FIG. 1.

The conducting wire wound in the winding 2 is arranged again from the slit 53 in the insulator 40 along the outer peripheral surface and becomes a jumper wire 95. The jumper wire 95 forms the winding 5 by being introduced to the inner peripheral surface from the slit 60 in the insulator 40 illustrated in FIG. 3, being folded on the lead side, and being wound around the drum part 25 in FIG. 1. The conducting wire wound in the winding 5 is connected to the neutral point 104 (Δ sign in FIG. 3).

Also, a conducting wire connected to a power line in the W-phase (W power line) 102 forms a winding 6 by being arranged as a jumper wire along the outer peripheral surface from the slit 57 in the insulator 40, being introduced to the inner peripheral surface from the slit 62 in the insulator 40, and being wound around the drum part 26 in FIG. 1.

The conducting wire wound in the winding 6 is arranged again from the slit 63 in the insulator 40 along the outer peripheral surface and becomes a jumper wire 99. The jumper wire 99 forms a winding 9 by being introduced to the inner peripheral surface from the slit 70 in the insulator 40 illustrated in FIG. 3, being folded at the neutral point 104 on the lead side as the folded wire 107, and being wound around the drum part 29 in FIG. 1.

The conducting wire wound in the winding 9 is arranged again from the slit 69 in the insulator 40 along the outer peripheral surface and becomes a jumper wire 93. The jumper wire 93 forms a winding 3 by being introduced to the inner peripheral surface from the slit 56 in the insulator 40 illustrated in FIG. 3, being folded on the lead side, and being wound around the drum part 23 in FIG. 1. The conducting wire wound in the winding 3 is connected to the neutral point 104 (Δ sign in FIG. 3).

In such a manner, when the insulator 40 according to the present embodiment is used, it is possible to easily wind a conducting wire with a winding machine by a connection system of parallel wire connection.

Also, in the brushless DC motor according to the present embodiment, when windings in the same phase (U-phase: winding 4, 7, and 1, V-phase: winding 8, 2, and 5, and W-phase: winding 6, 9, and 3) are connected in the serial wire connection illustrated in FIG. 4, there is no folding at the neutral point 104 in the windings 2, 7, and 9 around teeth that are not adjacent to the neutral point 104 and any of winding ends of the U power line 101, the W power line 102, and the V power line 103 unlike a case of the parallel wire connection illustrated in FIG. 2. Thus, the slits 53, 64, and 69 (slit for parallel wire connection) in the insulator 40 which slits are used by the folded wires 105, 106, and 107 are not used. As illustrated in FIG. 5, the conducting wire wound in the windings 2, 7, and 9 is extracted directly, whereby the wire is arranged from the newly-added slits 55, 66, and 71 (slit for serial wire connection) in the insulator 40 to a next winding along the outer peripheral surface. On the other hand, the power lines 101 to 103 are extracted from the windings 1, 3, and 5 in both of the serial wire connection and the parallel wire connection. Thus, whichever connection system is employed, a place of connection with an external power source that supplies power to a power line in each of the U-phase, the V-phase, and the W-phase and to a motor can be used in common.

In such a manner, by newly adding the slits 55, 66, and 71 for serial wire connection, the insulator 40 according to the present embodiment can be also used in a case where a connection system with serial wire connection is employed. Note that the slits 51, 52, 54, 56, 57, 58, 59, 60, 61, 62, 63, 65, 67, 68, and 70 are slits used in connection systems of both of the serial wire connection and the parallel wire connection (shared slit).

Note that the newly-added slits 55, 66, and 71 for serial wire connection are used in positions corresponding to teeth in the parallel wire connection and are preferably formed in a depth identical with that of the slits 53, 64, and 69 for parallel wire connection that are not used in the serial wire connection. It is to prevent a jumper wire extracted from each slit from intersecting with a jumper wire of a different conducting wire by making a height of a conducting wire extracted from the slit for serial wire connection and that from the slit for parallel wire connection identical.

As described above, since the insulator of the present embodiment can correspond to connection systems of both of the parallel wire connection and the serial wire connection, the number of times of winding becomes ⅓ and a wire diameter becomes (√3)=1.732 times larger when the parallel wire connection is changed to the serial wire connection. In such a manner, when the parallel wire connection is changed to the serial wire connection, it is possible to reduce time necessary for winding a wire. Also, since a wire with a larger diameter is cheaper, a cost of production is reduced.

Inversely, when the serial wire connection is changed to the parallel wire connection, the number of times of winding becomes three times larger and a wire diameter becomes 1/(√3)=0.577 times larger. In such a manner, when the serial wire connection is changed to the parallel wire connection, time necessary for winding a wire is increased. However, since a wire diameter becomes small, a small nozzle can be used in a winding machine. Thus, it is possible to increase a speed of winding and to make intervals in teeth adjacent in a circumferential direction (slot opening) smaller.

As described, according to the insulator and the brushless DC motor including the same of the present embodiment, it is possible to correspond to both connection systems. Thus, it is possible to select a connection system corresponding to a situation without changing the number of parts while considering a size or a use of a motor, time necessary for winding a wire, or the like. Also, since it is possible to share the insulator, parts can be used in common. Thus, it is possible to reduce a cost for a mold. Moreover, in the present embodiment, a case where the insulator is used on the opposite side of the lead side on which opposite side a jumper wire is wired has been described. However, the insulator of the present embodiment can be used also on the lead side where a power line or a neutral point is extracted. In such a manner, it is possible to use more parts in common.

Also, in a case of winding a wire with a winding machine by utilization of the insulator of the present embodiment, it is possible to immediately use serial wire connection and parallel wire connection in a combined manner only by selecting a program in the winding machine. Thus, it is possible to prevent a decrease in installation capacity.

Note that as a brushless DC motor including the insulator of the present embodiment, what has three phases and nine poles is used here. However, this is not the limitation and a similar effect can be acquired as long as a brushless DC motor has three phases and nine poles or more.

EXPLANATION OF REFERENCE

1, 2, 3, 4, 5, 6, 7, 8, 9 WINDING
11, 12, 13, 14, 15, 16, 17, 18, 19 INSULATOR EDGE
21, 22, 23, 24, 25, 26, 27, 28, 29 DRUM PART
40 INSULATOR
41 OUTER CLAW
42 OUTER PERIPHERAL WALL
43 INSULATOR OPENING
44 INSULATOR SLOT
45 PROTRUSION
51 to 71 SLIT
53, 64, 69 SLIT FOR PARALLEL WIRE CONNECTION
55, 66, 71 SLIT FOR SERIAL WIRE CONNECTION
51, 52, 54, 56 to 63, 65, 67, 68, 70 SHARED SLIT
80 ROTOR
81 ROTOR CORE
82 MAGNET
83 RIVET FOR ROTOR
84 END PLATE
91, 92, 93, 95, 97, 99 JUMPER WIRE
101 U POWER LINE

102 W POWER LINE
103 V POWER LINE
104 NEUTRAL POINT
105, 106, 107 FOLDED WIRE
110 STATOR
1101 to 1109 TEETH
120 BRUSHLESS DC MOTOR

The invention claimed is:

1. An insulator that insulates teeth of a stator, which is a component of a three-phase electric motor and which includes nine teeth or more, and a conducting wire wound around the teeth, the insulator comprising:
   an outer peripheral wall provided on a yoke of a stator core;
   a slit per phase in the outer peripheral wall for parallel wire connection which slit becomes a conducting wire extraction part, wherein a conducting wire wound around the teeth of the stator of the electric motor is extracted only in parallel wire connection;
   a slit per phase in the outer peripheral wall for serial wire connection which slit becomes a conducting wire extraction part only in serial wire connection; and
   a shared slit per phase in the outer peripheral wall that becomes a conducting wire extraction part in both of the serial wire connection and the parallel wire connection.

2. The insulator according to claim 1, wherein the slit for serial wire connection is provided in a position corresponding to the teeth that is not adjacent to a neutral point and a winding end of any power line in a case of the serial wire connection.

3. The insulator according to claim 2, wherein the slit for serial wire connection is formed in a depth identical to a depth of the slit for parallel wire connection.

4. A brushless DC motor including the insulator according to claim 1.

* * * * *